(No Model.)
O. KINSLEY.
LUMBER WAGON.
No. 296,019. Patented Apr. 1, 1884.
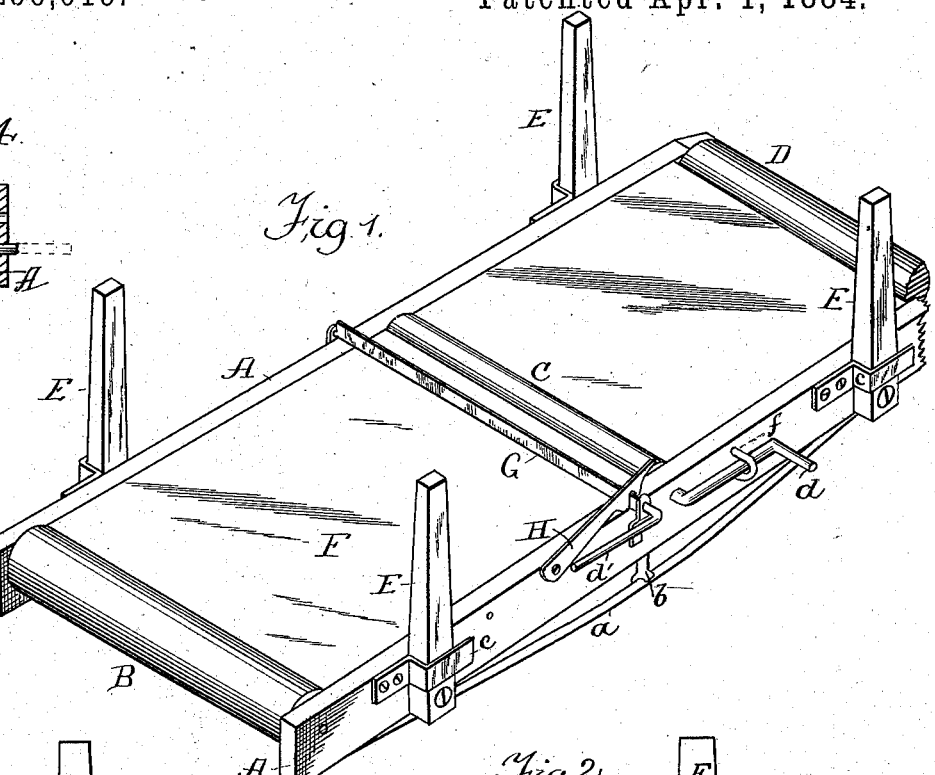
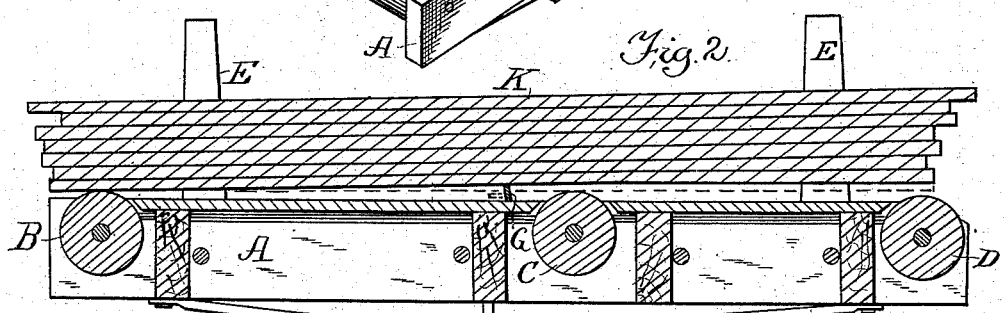
Witnesses:
Wm. A. Rosenbaum
H. A. Daniels
Inventor:
Owen Kinsley
By W. Burris
Atty

UNITED STATES PATENT OFFICE.

OWEN KINSLEY, OF CLINTON, IOWA.

LUMBER-WAGON.

SPECIFICATION forming part of Letters Patent No. 296,019, dated April 1, 1884.

Application filed January 8, 1884. (No model.)

*To all whom it may concern:*

Be it known that I, OWEN KINSLEY, a citizen of the Province of New Brunswick, and a subject of the Queen of Great Britain, residing at Clinton, in the county of Clinton and State of Iowa, have invented certain new and useful Improvements in Lumber-Wagons, of which the following is a description, reference being had to the drawings hereto annexed.

My invention consists of a wagon-bed strengthened by trusses and provided with friction-rollers, pivoted standards, a locking-bar, and devices for operating and locking the bar and the rollers, whereby lumber may be securely held upon the bed while being hauled upon the wagon, and may be readily unloaded, as hereinafter fully described.

In the accompanying drawings, Figure 1 is a perspective view of a wagon-bed having my improvements. Fig. 2 is a longitudinal section. Fig. 3 is a side elevation. Figs. 4 and 5 are cross-sections on line $x\ x$ of Fig. 3.

A designates the frame of the bed, the sides of which are provided with the truss-rods $a$, bolted to the frame at each end and trussed by the screw-bolts $b$ in the center, as shown in the drawings.

B C D designate three rollers—one at each end and one at the middle of the bed—each provided with suitable journals having their bearings in the sides of the bed-frame.

E designates the standards, pivoted to the frame A, and supported when in an upright position by the open clips $c$.

F is the floor of the bed. The rollers are all arranged vertically, so that their upper surfaces extend slightly above the floor of the bed, and the middle roller, C, is slightly above the plane of the end rollers, and one end of this roller is provided with the crank $d$.

G is an angular iron bar of suitable size, usually about one-half inch thick by two inches wide, journaled at the ends and supported in suitable bearings attached to the sides A of the frame in front of the middle roller. This bar is located vertically, so that its edge, when turned upward, will extend slightly above the roller C, as shown in the drawings. One end of the bar is provided with the crank-arm $d'$.

H is a dog pivoted to the frame, and provided with a transverse slot to fit over the bar G, to hold it in place when turned upward. The dog is arranged to lock the bar in a position slightly inclined from the vertical, as shown. It is evident, however, that it may be locked in a vertical position or at any required angle. A staple, $f$, is inserted loosely through holes in the sides of the frame in position to lock the crank $d$ of the roller C. The prongs of this staple may be both about the same length, as shown in Fig. 4, so as to be drawn entirely out to unlock the roller-crank; or one prong, $h$, may be longer, and may be provided with a set-nut, $h'$, as seen in Fig. 5, so that the staple may be withdrawn far enough to release the crank, and the staple may then be shoved inward out of the way of the crank, thus preventing the liability of losing the staple, which may occur when it is taken entirely out and laid down while the lumber is being unloaded. A straight rod or pin may be employed instead of the staple to lock the roller-crank; but the staple is preferable, because it holds the crank from turning either way. The bed is constructed so as to incline slightly to the rear when placed upon the wagon. The crank $d$ of the roller C may be kept locked by the staple $f$ at all times, except when the lumber is being unloaded. In loading, the standards are placed in an upright position, and the lumber K is placed upon the bed so as to rest on the front and middle rollers, or upon the front roller and lock-bar when that bar is in use. When the lumber is icy, or from other causes it is liable to slide endwise on the rollers, the bar G is turned upward by means of the crank-arm $d'$, and is locked in that position by the dog H, as shown in Fig. 3 of the drawings, so that the lumber rests mostly upon the angular edge of the lock-bar, and is thus effectually prevented from sliding endwise on the rollers. When the wagon is in position for unloading, the crank $d$ is released from the staple $f$, and the bar G is unlocked by lifting the dog H, allowing the bar to turn down below the lumber, which then rests upon the front and middle rollers, mostly upon the latter, and by turning the roller C by means of the crank $d$ the lumber is moved backward till it tilts over the rear roller, D, as seen in dotted lines in Fig. 3. The wagon is then moved forward, dumping the entire load in a straight compact position. As the lumber is moved rearward, the standards are turned down, as shown in dotted lines in Fig. 3.

I am aware that racks for lumber-wagons have been constructed with rollers and oscillating supports operated by connecting-rods and cranks, and I do not claim such devices, broadly.

What I claim as new, and desire to secure by Letters Patent, is—

1. The combination, in a wagon-bed or lumber-wagon rack, with the end rollers, B D, of the middle roller, C, the upper surface of which middle roller is slightly above the plane of the upper surfaces of the end rollers, the crank $d$, attached to the end of the middle roller, and the adjustable locking-staple $f$, substantially as and for the purposes described.

2. The combination, in a lumber-wagon rack, of the rollers B C D, the crank $d$, the adjustable locking-staple $f$, and the pivoted standards E, adapted to fold down automatically, substantially as and for the purposes described.

3. The combination, in a lumber-wagon rack, of the rollers B C D, the crank $d$, the adjustable staple $f$, the pivoted standards E, the angular lock-bar G, and the dog H, substantially as and for the purposes described.

In testimony whereof I hereto affix my signature in presence of two witnesses.

OWEN KINSLEY.

Witnesses:
W. W. SANBORN,
H. F. BOWERS.